[12] United States Patent
Allen et al.

(10) Patent No.: US 10,169,703 B2
(45) Date of Patent: Jan. 1, 2019

(54) SYSTEM AND METHOD FOR ANALOGY DETECTION AND ANALYSIS IN A NATURAL LANGUAGE QUESTION AND ANSWERING SYSTEM

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 14/989,897

(22) Filed: Jan. 7, 2016

(65) Prior Publication Data
US 2017/0200081 A1  Jul. 13, 2017

(51) Int. Cl.
*G06N 5/02* (2006.01)
*G06F 17/27* (2006.01)

(52) U.S. Cl.
CPC ........... *G06N 5/02* (2013.01); *G06F 17/2705* (2013.01); *G06F 17/2785* (2013.01)

(58) Field of Classification Search
CPC ................................................. G06F 17/2785
USPC ........................................ 704/9; 706/46, 54
See application file for complete search history.

(56) References Cited

U.S. PATENT DOCUMENTS

| 6,523,026 | B1 | 2/2003 | Gillis |
| 6,816,857 | B1* | 11/2004 | Weissman ......... G06F 17/30684 |
| 8,190,422 | B2 | 5/2012 | Ascoli et al. |
| 8,972,339 | B2 | 3/2015 | Aparicio, IV et al. |
| 2015/0310002 | A1* | 10/2015 | Yu ........................ G06F 17/241 707/750 |
| 2017/0200081 | A1* | 7/2017 | Allen ...................... G06N 5/02 |

OTHER PUBLICATIONS

Turney, Peter D. "Distributional semantics beyond words: Supervised learning of analogy and paraphrase." arXiv preprint arXiv:1310.5042 (2013). (Year: 2013).*
Shutova, Ekaterina. "Models of metaphor in NLP." Proceedings of the 48th annual meeting of the association for computational linguistics. Association for Computational Linguistics, 2010. (Year: 2010).*

(Continued)

*Primary Examiner* — William Spieler
(74) *Attorney, Agent, or Firm* — Terrile, Cannatti & Chambers, LLP; Michael Rocco Cannatti

(57) ABSTRACT

A system, method, and a computer program product are provided for evaluating an analogical pattern by applying natural language processing to an information source to identify analogical pattern terms in a first analogical pattern, applying deep analysis to refine the analogical pattern terms based on semantic analysis to form metadata for the first analogical pattern, generating interpretations of different combinations of the first analogical pattern terms and the metadata, and then scoring each interpretation for each of the different combinations to select a first interpretation exceeding a predetermined threshold for interpretation of the analogical pattern, thereby evaluating the first analogical pattern.

21 Claims, 4 Drawing Sheets

(56) References Cited

OTHER PUBLICATIONS

Langlais, Philippe. "Issues in Analogical Learning over Sequences of Symbols: a Case Study with Named Entity Transliteration." Similarity and Analogy-based Methods in AI SAMAI 2012: 49. (Year: 2012).*

Shutova, Ekaterina, Simone Teufel, and Anna Korhonen. "Statistical metaphor processing." Connputational Linguistics39.2 (2013): 301-353. (Year: 2013).*

R. High, "The Era of Cognitive Systems: An Inside Look at IBM Watson and How it Works," IBM Redbooks, 2012.

Yuan et al., "Watson and Healthcare," IBM developerWorks, 2011. IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Wikipedia, Analogy, downloaded Nov. 30, 2015, https://en.wikipedia.org/wiki/Analogy.

Adrian Boteanu et al., Solving and Explaining Analogy Questions Using Semantic Networks, Proceedings of the Twenty-Ninth AAAI Conference on Artificial Intelligence, 2015.

Lorand Dali et al., Question Answering Based on Semantic Graphs, WWW 2009, Apr. 2009, Madrid, Spain.

Lisa Gandy et al., Automatic Identification of Conceptual Metaphors with Limited Knowledge, Proceedings of the Twenty-Seventh AAAI Conference on Artificial Intelligence, 2013.

Su Nam Kim et al., An Unsupervised Approach to Interpreting Noun Compounds, Proceedings of 2008 IEEE International Conference on Natural Language Processing and Knowledge Engineering (IEEE NLP-KE'08), Beijing, China.

Jurij Leskovec et al., Extracting Summary Sentences Based on the Document Semantic Graph, Microsoft Research, MSR-TR-2005-07, Jan. 31, 2005.

* cited by examiner

SYSTEM AND METHOD FOR ANALOGY DETECTION AND ANALYSIS IN A NATURAL LANGUAGE QUESTION AND ANSWERING SYSTEM

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. To process and answer questions, the QA system may be trained with question-answer (QA) pairs derived from a database or corpus of knowledge, but the resulting answers can be incorrect or inaccurate for a variety of reasons relating to the peculiarities of language constructs and human reasoning for understanding same. For example, analogies are language constructs which enable people to transfer knowledge from one situation or context (the source) to another (the target) based on a conceptual similarity therebetween, and provide powerful cognitive mechanisms or tools that can be used to explain something that is unknown in terms of a related concept that is known to someone. At the core of analogical reasoning lies the concept of similarity, but the process of understanding an analogy requires reasoning from a relational perspective that can be challenging, especially for people learning a new language since the word-for-word translation may not capture the essence of the original statement. In addition, automated QA systems and other natural language systems which come across an analogy in a question or answer corpus will also have a difficult time with identifying and understanding analogies. As a result, the existing solutions for efficiently identifying and understanding analogies for training and/or use by a QA system are extremely difficult at a practical level.

SUMMARY

Broadly speaking, selected embodiments of the present disclosure provide a system, method, and apparatus for identifying and/or understanding analogies (e.g., analogical language, such as exemplifications, comparisons, metaphors, similes, allegories, and parables) by using the cognitive power of the information handling system to detect and categorize analogical patterns based on the terms in the detected analogical pattern and derived characteristic metadata, to generate potential meanings for each detected analogical pattern from characteristic metadata for terms in the analogical pattern, and to identify a best meaning for the detected analogical pattern by analyzing and scoring the potential meanings. As an initial step, the information handling system identifies or detects an analogy in an input sentence or text segment by performing a sentence structure and ontological analysis to identify sentence terms and associated metadata which are structured as one or more candidate analogical patterns having a first analogic (e.g., left or source term type and analogical phrase) connected by a comparator to a second analogic (e.g., right or target analogical phrase and characteristic term). In this initial step, one or more learning methods may be applied to match a detected analogical pattern to one or more known analogical patterns to categorize and detect the input sentence or text segment as an analogy. In addition, specific terms in the detected analogical pattern may be analyzed for entity resolution, ontology, and other term characteristics or metadata (e.g., by using the definition of the terms and ontology) for use in detecting the analogy and/or determining the outcome or meaning of the analogy. In determining the meaning of the detected analogical pattern, the information handling system uses the definitions of the terms and ontology in the analogical pattern to map a source from one domain to a target in a different domain by examining attribute similarity across the domains to determine and score potential meanings of the analogy based on the options from the term characteristic alignments and their agreements when combined. For example, an outcome analysis may be applied to the analogical pattern and associated metadata to look at verb term components of a sentence in assessing the noun-verb-object relationships and the categories, and to determine the most likely options via scoring the terms and likelihood they belong together or are should be associated. The outcome analysis may include application of a learning method for previously similar analogies or noun-verb relationship in a similar pattern, along with performing definition extraction for the verb in relation to the noun/object characteristics and the comparator/idiomatic used. Whatever meaning of the detected analogical pattern that is deduced from the combination of the source analogic characteristic and metadata with the target analogic outcome may then be presented with the evidence from the characteristics and meaning and any corpus references that are used to help in the determination. In this way, the structure and meaning of analogies included in language can be detected as unique identifiable patterns for use in training the information handling system for identifying potential analogies, improving the accuracy of a cognitive system, and/or detecting and understanding analogies for use in providing more human-like interaction in dialog services.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
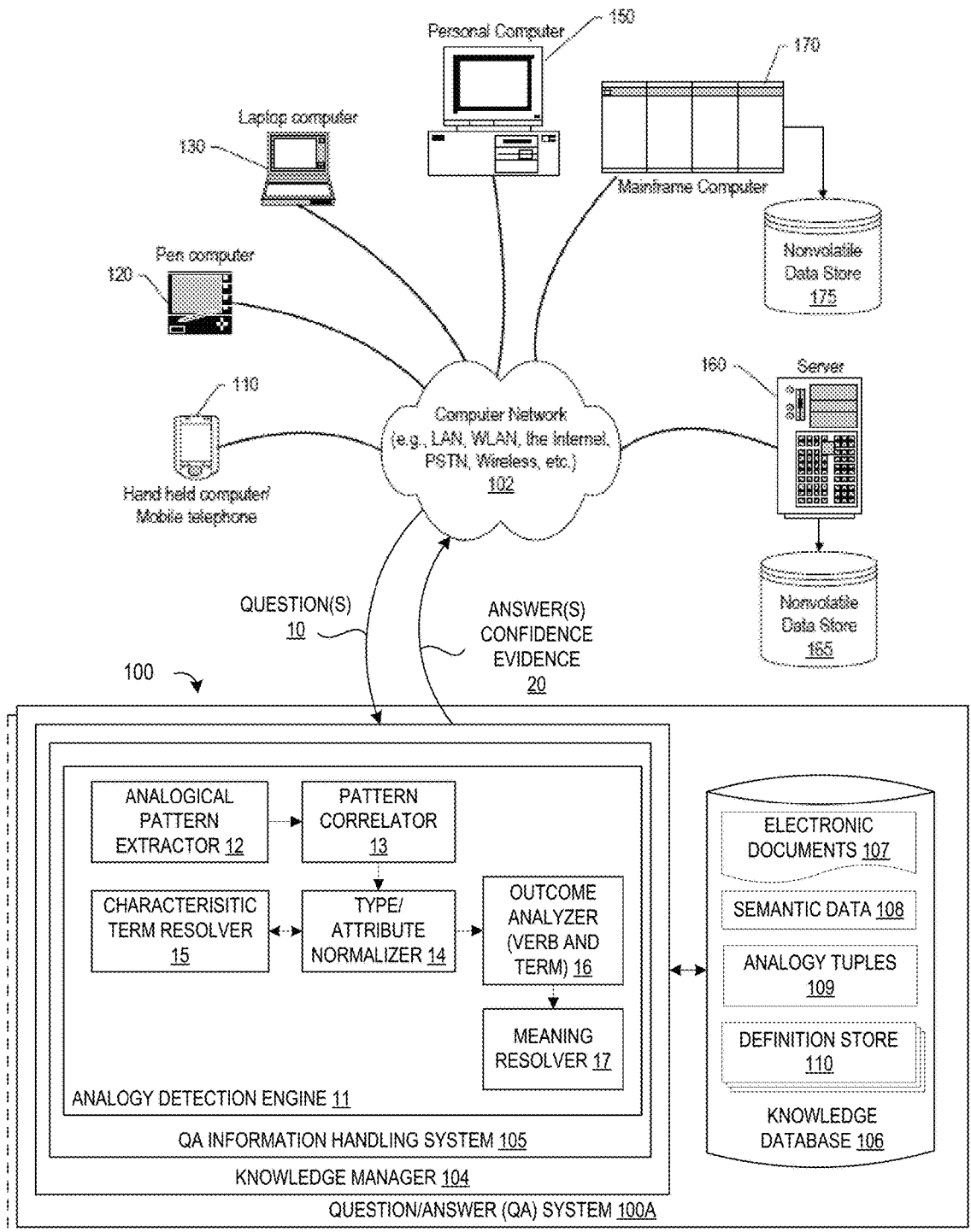
FIG. 1 depicts a system diagram that includes a QA system connected in a network environment that uses an analogy detection engine to identify and analyze analogies.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently identifying and analyzing analogies for processing and/or training by a QA system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected across a computer network 102 to a plurality of computing devices (e.g., 110, 120, 130), where the QA system 100 uses an analogy detection engine 11 to identify and analyze analogies. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, subsystems, and/or devices other than those that are depicted herein.

In the QA system 100, the knowledge manager 104 may be configured to receive inputs from various sources. For example, knowledge manager 104 may receive input from the network 102, one or more knowledge bases or corpora 106 of electronic documents 107, semantic data 108, or other data, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in an electronic document 107 for use as part of a corpora 106 of data with knowledge manager 104. The corpora 106 may include any structured and unstructured documents, including but not limited to any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

To process and answer questions, the QA system 100 may include an information handling system 105 which uses an analogy detection engine 11 to identify and analyze analogies by detecting and categorizing analogical patterns, generating potential meanings for each detected analogical pattern from characteristic metadata for terms in the analogical pattern, and identifying a best meaning for the detected analogical pattern by analyzing and scoring the potential meanings based on the characteristic metadata and terms in the detected analogical pattern. Though shown as being embodied in or integrated with the QA system 100, the information handling system 105 and/or analogy detection engine 11 may be implemented in a separate computing system (e.g., 150) that is connected across a network 102 to the QA system 100. Wherever embodied, the cognitive power of the an analogy detection engine 11 detects and categorizes analogical patterns, generates potential meanings for each detected analogical pattern, and identifies a best meaning for the detected analogical pattern by analyzing and scoring the potential meanings based on the characteristic metadata and terms in the detected analogical pattern.

In selected example embodiments, the analogy detection engine 11 may include an analogical pattern extractor 12 that is configured to apply natural language processing (NLP) to detect an analogy in a source text segment by mapping parsed terms and phrases from the sentence into one or more potential pattern categories. As described in more detail with reference to FIG. 3, the analogical pattern extractor 12 may perform a sentence structure analysis to parse sentences and denote terms identifying one or more analogical patterns having a source analogic (e.g., source term type and analogical phrase) connected by a comparator to a target analogic (e.g., target analogical phrase and characteristic term). For example, the information handling system may use an English Slot Grammar (ESG) parser to perform parse of a source sentence to detect one or more specified analogical patterns (e.g., "[noun] [verb] like [x] as a [y]" or variations thereof, such as "[noun] [verb phrase] [comparator] [adjective] [noun phrase]"). The analogical pattern extractor 12 may also be configured to apply one or more learning methods to match a detected analogical pattern to known patterns to decide and categorize the source sentence as an analogy.

Upon extraction of potential analogical pattern(s), the analogy detection engine 11 may be configured to assign potential terms and phrases to distinct terms based on analysis of the term type and associated characteristics. To this end, the analogy detection engine 11 may include a pattern correlator 13 that is configured to apply deep analytic analysis to refine specific terms in the detected analogical pattern for entity resolution, ontology, and other term characteristics or metadata (e.g., by using the definition of the terms and ontology) for use in determining the outcome or meaning of the analogy. The deep analysis performed by the pattern correlator 13 may use the right or left analogic to search the corpus or knowledge database 106 for matching references to provide evidence for possible meaning to the analogy. The retrieved evidence references may then be processed by a type and/or attribute normalizer 14 which uses an ontology, entity resolver, or other definition store 110 to normalize the reference type or attribute (e.g., for the noun or object or verb term). To support the normalization process, the analogy detection engine 11 may also include a characteristic term resolver 15 which uses the words in the definition or meaning of the term in addition to major characteristics associated with the term to assist the pattern correlator in assignment and resolving a term. As a result of processing the retrieved evidence references from the pattern correlator 13 with the characteristic term resolver 15, the type/attribute normalizer 14 generates potential meanings for each detected analogical pattern from the analogical pattern terms and associated characteristic metadata.

To evaluate which of the potential meanings best corresponds to the detected analogical pattern, the analogy detection engine 11 may be configured to use the definitions of the terms and ontology in the analogical pattern to determine and score potential meanings of the analogy based on the options from the term characteristic alignments and their agreements when combined. For example, the analogy detection engine 11 may include an outcome analyzer 16 for applying an outcome analysis to the analogical pattern and associated metadata to look at the noun-verb-object relationships and the categories to determine the most likely options by scoring the terms and likelihood they belong together or are should be associated. The outcome analyzer 16 may apply a learning method for previously similar analogies or noun-verb relationship in a similar pattern, along with definition extraction for the verb in relation to the noun/object characteristics and the comparator/idiomatic used. The meaning of the detected analogical pattern may be deduced at the meaning resolver 17 as a combination of the source analogic characteristic and metadata with the target analogic outcome, and then presented with the evidence from the characteristics and meaning and any corpus references that are used to help the determination.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
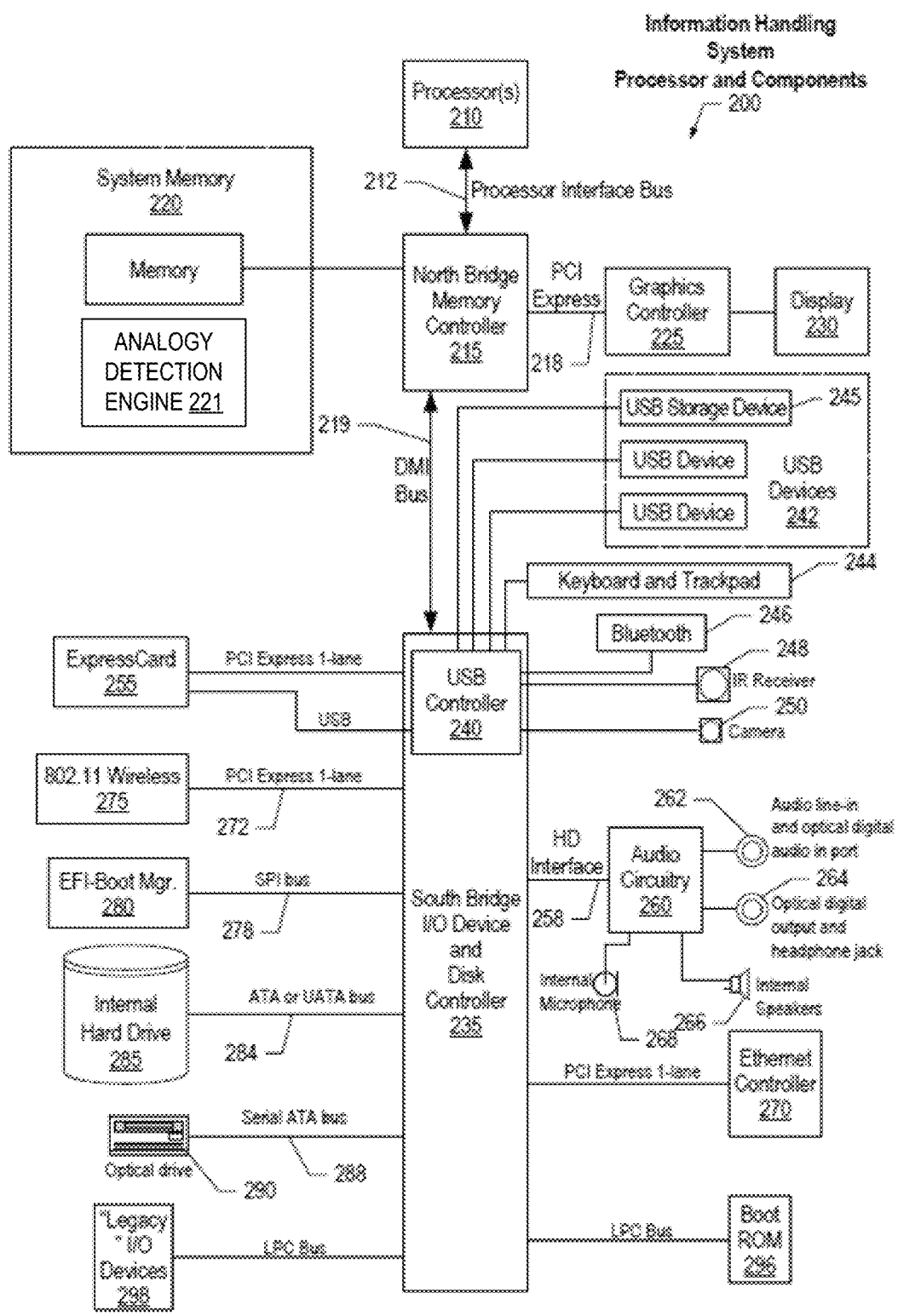
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including an analogy detection engine module 221 which may be invoked to detect an analogy by parsing or breaking a sentence into a discrete analogical pattern and then use definitions of the terms in the analogical pattern(s) to determine the potential meanings of the analogy. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
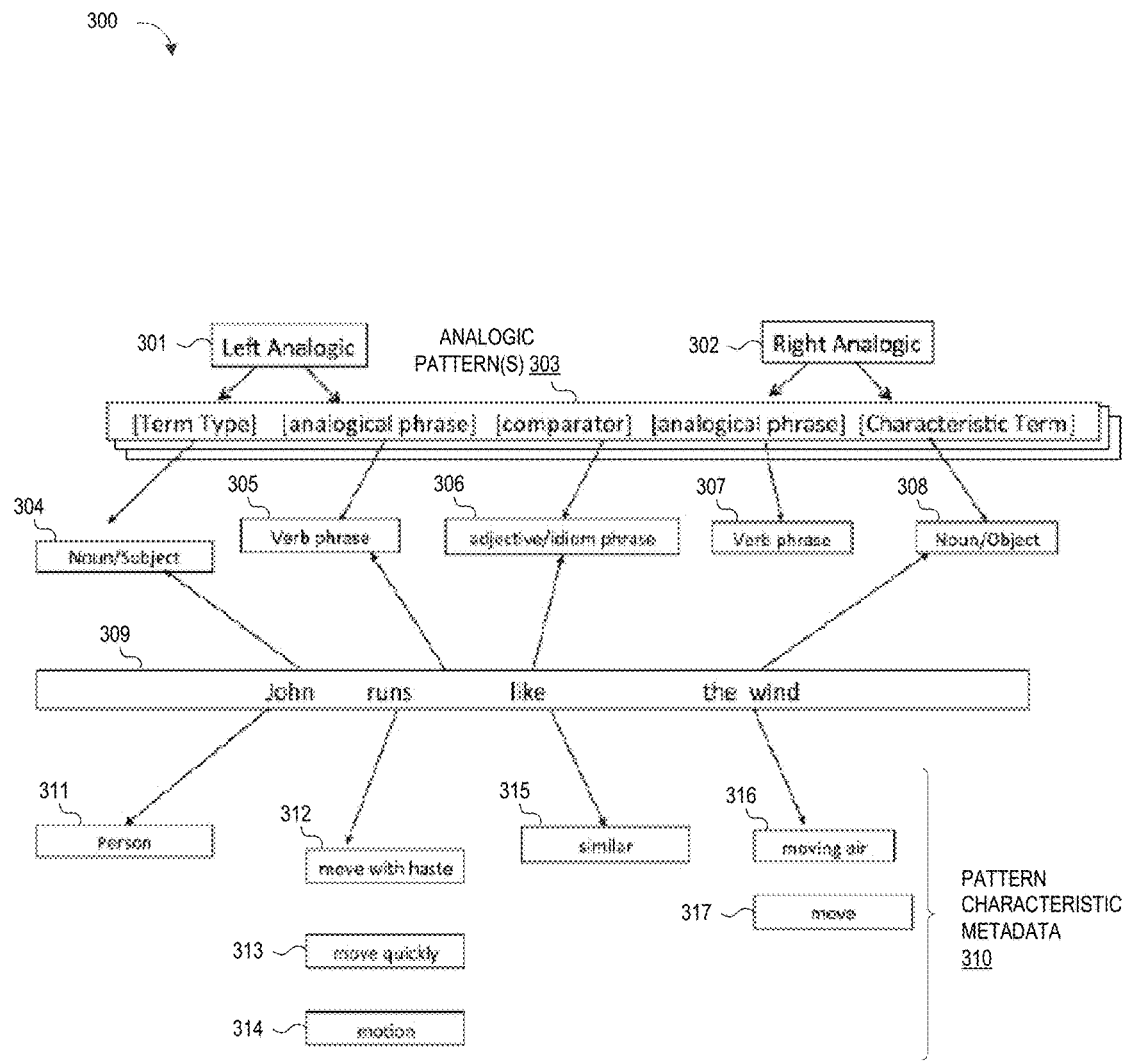
FIG. 3 is a block diagram illustration of applying a linguistic analysis to identify an analogical pattern and generate associated characteristic metadata.

To provide additional details for an improved understanding of selected embodiments of the present disclosure, reference is now made to FIG. 3 which diagrammatically illustrates in block diagram form the application of linguistic analysis to a sentence 309 (e.g., "John runs like the wind") to identify an analogical pattern and generate associated characteristic metadata. As disclosed herein, the linguistic analysis processing may be performed by a cognitive system, such as the QA system 100 or any suitable information handling system.

In order to detect if the sentence 309 is an analogy, a sentence parsing tool or related NLP process is applied to break the sentence into its constituent parts 304-308 to find the sentence parts and location sequence. For example, a parsing process applied to the sentence 309 identifies the sentence terms and structure as including subject noun term 304 ("John") and verb phrase 305 ("runs"), adjective or idiom phrase 306 ("like"), and object verb phrase 307 and noun term 308 ("the wind"). Depending on the language in the sentence 309, the grammatical parsing may generate different sentence terms and/or structures. To further assist with analogy detection processing, each of the parsed sentence terms or parts (e.g., 304-307) may be further analyzed for entity resolution, ontology, and/or associated characteristics in order to generate pattern characteristic metadata 310 for use in refining the terms of the detected analogical pattern. For example, a deep analytic semantic analysis may be applied to the parsed terms 304-307 by using term definitions or other ontology analysis to determine that the parsed subject noun term "John" in the sentence 309 is associated with the corresponding "person" characteristic metadata 311. In similar fashion, the parsed subject verb phrase term "runs" in the sentence 309 is associated with multiple characteristic metadata terms, including the "move with haste" characteristic 312, the "move quickly" characteristic 313, and the "motion" characteristic 314. In addition, the parsed comparator term "like" in the sentence 309 is associated with the "similar" characteristic 315, while the parsed object noun term "the wind" is associated with the "moving air" characteristic 316 and the "move" characteristic 317.

The parsed sentence terms or parts 304-308 and corresponding pattern characteristic metadata 310 are then categorized into an analogical pattern which is characterized by a first or "left" analogic 301 (having a first term type and analogical phrase) that is connected by a comparator term to a second or "right" analogic 302 (having a second analogical phrase and characteristic term). For example, the analogical pattern categorization process may be implemented by applying a learning method to match various combinations of the parsed sentence terms or parts 304-308 and corresponding pattern characteristic metadata 310 to one or more known analogical patterns 303 to decide and categorize the sentence or phrase 309 as an analogy. If the syntactic structure of a combination pattern of parsed sentence terms or parts 304-308 and corresponding pattern characteristic metadata 310 matches a known analogical pattern 303, the relevant analogy terms and pattern types are identified as a candidate meaning and associated for use in subsequent processing. For example, the detected analogy pattern may be (noun like, as a, etc.), and the object noun term may be pulled and associated with the object verb phrase.

The generated candidate meanings for the detected analogy may be scored and analyzed to determine which candidate meaning has the best meaning using an outcome analysis. The outcome analysis may include applying machine learning method which uses previously identified similar analogies or noun-verb relationships having a similar pattern. For example, an outcome analysis may be applied to look at the noun-verb-object relationships (e.g., noun/object|verb phrase=>meaning) and the categories to determine the most likely options via scoring the terms and likelihood they belong together or are should be associated. In addition, the outcome analysis may use the extracted pattern characteristic metadata 310 to deduce a word or phrase meaning of the analogy phrase 309 by combining the left analogic characteristic metadata (e.g., 311-314), comparator, and right analogic outcome (e.g., 315-317). Such an outcome analysis could be represented as "left analogic characteristics & metadata|comparator|right analogic characteristics=>meaning." As used herein, an "analogic" refers to a combination of a term and an analogical phrase that is part of an analogy statement, and can usually be found before and/or after the comparator in the sentence. In the example of FIG. 3, the source or "left" analogic 301 includes the source term "John" and analogical phrase "runs" appearing in front of the comparator term "like," while the target or "right" analogic 302 includes "the wind" as the target analogical phrase and characteristic term. In this approach, the terms and phrases that come together in the analogic parts will serve to generate key metadata 310, and the idiomatic phrase or adjective in the comparator term strongly defines how the target or right analogic noun object and its metadata will determine the implied meaning of the analogy phrase 309.

Figure 4:
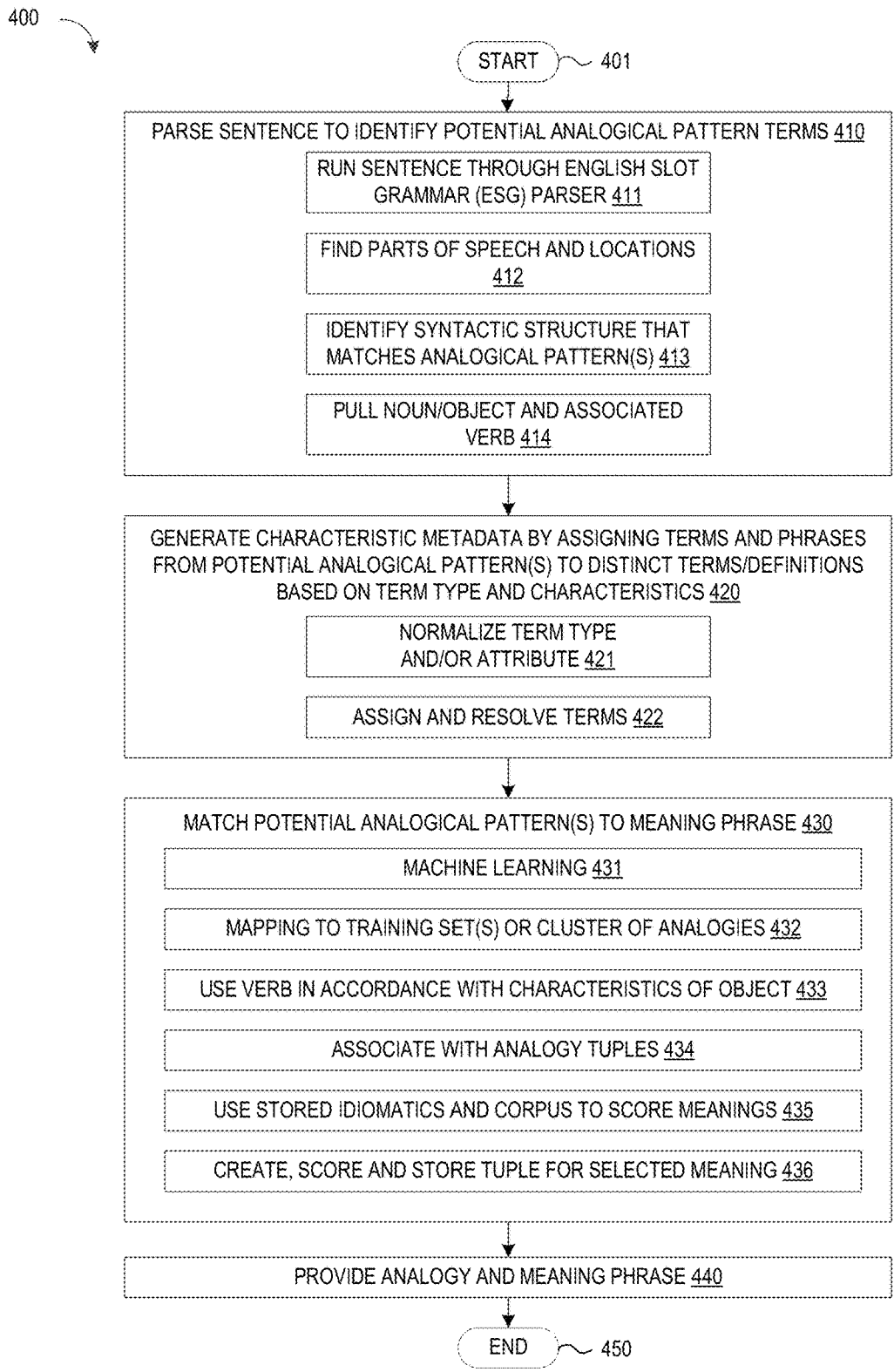
FIG. 4 illustrates a simplified flow chart showing the logic for identifying and analyzing analogies by extracting potential analogical patterns and terms from a source text, refining the terms to form metadata for the analogical pattern, and scoring combinations of analogical pattern terms and metadata to find a meaning for the analogical pattern.

To provide additional details for an improved understanding of selected embodiments of the present disclosure, reference is now made to FIG. 4 which depicts a simplified flow chart 400 showing the logic for identifying and analyzing analogies by extracting potential analogical patterns and terms from a source text, refining the terms to form metadata for the analogical pattern, and scoring combinations of analogical pattern terms and metadata to find a meaning for the analogical pattern. As disclosed herein, the processing shown in FIG. 4 may be performed by a cognitive system, such as the QA system 100 or any suitable information handling system, to detect and analyze analogies. Wherever implemented, the disclosed analogy detection scheme identifies analogies and their meanings by performing a sentence structure analysis based on matching analogical constructs, and then annotates any detected analogical patterns with meaning from the corpora and similar analogies to identify multiple potential meanings that are scored and analyzed to determine the best meaning for the analogy based on the options from the term characteristic alignments and their agreements when combined.

FIG. 4 processing commences at 401 whereupon, at step 410, a sentence is parsed to identify one or more potential analogical pattern terms in the sentence. For example, a source text sentence may be retrieved from memory storage stored in a database 106 and parsed to extract potential analogical pattern terms. The processing at step 410 may be performed at a computing system, such as the QA system 100 or other NLP question answering system, having an analogy pattern extractor (e.g., 12). In selected embodiments, the sentence parsing at step 410 uses an analogy pattern extractor to run the source text sentence through an ESG parser (at step 411) and then uses the parse results to find parts of speech and their locations in the sentence (at step 412). As will be appreciated, sentence parsing process takes a given input sentence statement and identifies constituent terms, phrases, and comparators which may be processed for match comparison against defined analogical patterns. As described herein, a Natural Language Processing (NLP) routine may be used to parse the input sentence and/or identify potential analogical patterns, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. In selected embodiments, the analogy detection engine 11 is configured to perform natural language processing to decompose the received input sentence, e.g., by performing one or more of: (1) identifying syntactic labels (e.g., "this," "that," etc.) in the received statement in which the syntactic labels are indicators for breaking a statement into two or more statements; (2) identifying a conjunction(s) (e.g., "and," "but," etc.) that connects two parallel statements; (3) identifying configuration information of the received statement that includes, but is not limited to: (a) a syntactic contour that shows a main clause and a subordinate clause characterize a same entity, and (b) an indicative of a nested statement that focuses on one of several underspecified entities which do not share their facts; (4) identifying pre-modifiers (e.g., an adjective(s) in front of a named entity) and/or post-modifiers (e.g., an adjective(s) behind of a named entity) in the received statement which separate the received statement into one element and a statement; (5) identifying relative qualifiers (e.g., "the first," "only," "the westernmost," etc.) which need to be completed by information from elsewhere. The analogy detection engine 11 may also be configured to separate the received input sentence according to one or more of: the identified at least one clause, the identified at least one syntactic label, the identified at least one conjunction, the identified configuration information, the identified at least one pre-modifier or post-modifier, and the identified at least one relative qualifier.

At step 420, the analogy evaluation processing proceeds to generate characteristic metadata for the identified pattern terms by assigning terms and phrases from the identified pattern terms to distinct terms or definitions based on the detected term type and characteristics. The processing at step 420 may be performed at a computing system, such as the QA system 100 or other NLP question answering system, having a pattern correlator (e.g., 13) for assigning terms and phrase to each term in the analogy. In selected embodiments, the generation of characteristic metadata at step 420 uses the pattern correlator to search the corpus for evidence references corresponding to the metadata. In addition, the processing at step 420 may normalize the retrieved evidence references by type or attribute by using a type/attribute normalizer (at step 421). In addition, the pattern correlator may use a characteristic term resolver to assist the pattern correlator with assigning and resolving terms based on the words in the definition or meaning of the term in addition to major characteristics associated with the term (at step 422). As will be appreciated, the processing at step 420 generates characteristic metadata for each term in the input sentence statement for use in generating a list of potential meanings for the detected analogy by using the characteristic metadata to build multiple possible meaning options. As described herein, a deep analysis of the terms in the detected analogical pattern may use a variety of reasoning algorithms. There may be hundreds or even thousands of reasoning algorithms applied, each of which performs different analysis to assign potential terms and phrases to each term in the detected analogical pattern. For example, some reasoning algorithms may look at the matching of terms and synonyms within the language of the input sentence and the corpus of data.

At step 430, after generating characteristic metadata, the analogy evaluation processing proceeds to match potential analogical patterns to a specified meaning phrase. The processing at step 430 may be performed at a computing system, such as the QA system 100 or other NLP question answering system, to deduce the analogy meaning using a variety of different approaches. The processing at step 430 may also use an outcome analyzer (e.g., 16) and/or meaning resolver (e.g., 17) to generate interpretations of different combinations of the analogical pattern terms and the characteristic metadata and then score each interpretation for each of the different combinations to select an interpretation exceeding a predetermined threshold for interpretation of the analogical pattern, thereby evaluating the first analogical pattern.

In selected embodiments, the processing to match meaning at step 430 may use an outcome analyzer (e.g., 16) and/or meaning resolver (e.g., 17) to apply a machine learning process at step 431 which focuses on building features related to the constituent components of the detected analogical patterns. At step 431, the outcome analyzer may process the analogical pattern and associated metadata to assess the relationship between the extracted noun-verb-object terms to determine the analogy meaning (e.g., noun/object|verb=>meaning). In addition or in the alternative, the outcome analyzer may process the analogical pattern and associated metadata to assess the relationship between the left analogic characteristic metadata, comparator, and right analogic characteristics to determine the analogy meaning (e.g., left analogic characteristics & metadata-|comparator|right analogic characteristics=>meaning).

In other embodiments, the processing to match meaning at step 430 may use an outcome analyzer (e.g., 16) and/or meaning resolver (e.g., 17) at step 432 to map the constituent components of the detected analogical pattern to one or more training sets (e.g., multiple mapping sets). At step 432, the outcome analyzer may process the analogical pattern terms (e.g., verb phrase terms) and associated metadata for mapping into idiomatic phrases and potential outcomes based on the analogical pattern and pattern correlator options. In addition or in the alternative, the processing at step 432 may use the outcome analyzer to process the analogical pattern terms and associated metadata for mapping to a cluster of analogies and entity characteristics and verbs.

In other embodiments, the processing to match meaning at step 430 deduces meaning at step 433 by using the verb in accordance with the characteristics of the object.

In other embodiments, the processing to match meaning at step 430 may use an outcome analyzer (e.g., 16) and/or meaning resolver (e.g., 17) at step 434 to associate the analogical pattern terms with existing analogy tuples. For example, the outcome analyzer at step 434 may associate the analogical pattern terms and associated metadata with existing combinations of object/verb terms stored as analogy tuples in the corpus to interpret their meaning. Based on the set of potential outcomes, the meaning resolver assigns a general meaning or specific meaning to the statement based on the noun/subject and outcome.

In other embodiments, the processing to match meaning at step 430 may score potential meanings at step 435 by using a store of Wiktionary idiomatics (e.g., https://en.wiktiionary.org/wiki/a_cut_above#Adjective) that is backed against corpus 106. For example, idiomatic terms and their definitions could be retrieved from a definition store (e.g., Wiktionary). By parsing the meanings from the statements, their meaning can be matched by matching them back to the input sentence based on term similarity, and then matching them to the surrounding text of the analogy across the system corpus. In selected embodiments, the outcome analyzer (e.g., 16) and meaning resolver (e.g., 17) work together at step 435 to use the characteristics and the recurrence of the same type of tuple combination to score the likely meaning for the combination, such as by determining the likelihood that an object/noun could exhibit those characteristics in association with the verb phrase or idiomatic.

Once a meaning is determined for the analogy, a tuple of the analogy may be created and stored at step 436. For example, an object=>verb=>meaning tuple may be stored in the tuples store 109 of the knowledge database 106 for subsequent use in processing other analogies (e.g., at step 434). In addition, the resulting tuple may be scored at step 436 based on the existing analogy structure similarity and meaning match.

At step 440, the identified analogy and deduced meaning are provided for display and review. The processing at step 440 may be performed at a computing system, such as the QA system 100 or other NLP question answering system, to present the analogy meaning. If desired, a threshold requirement may be applied to require that any identified analogy and associated meaning have an associated score that meets or exceeds a minimum score threshold.

To illustrate selected training examples to demonstrate the detection and deduction of meaning for an analogy, consider a first example of the sentence, "John runs like the wind." Once parsed into terms by the pattern extractor, the sentence is broken into its constituent noun/subject part (John), verb phrase part (runs), adjective/idiom phrase part (like), and noun/object part (the wind) which form a pattern. The constituent parts of the sentence pattern may then be assigned distinct terms based on the analysis of the term type and characteristics, thereby forming characteristic metadata for the parsed terms. Using various combinations of parsed terms and metadata, a plurality of candidate patterns are generated which have the same first analogic-comparator-second analogic structure. For example, a candidate pattern might be "He runs like the wind" having the analogic pattern, [subject] [motion verb] like [wind]. Using the first or second analogic of a candidate pattern (e.g., "wind"), the corpus and/or analogy tuple store may be searched to find similar or matching evidence references and associated meanings. Example evidence references returned from the corpus search might include "Steve Prefontaine ran as fast as the wind" and "He runs like the wind" and "He moves like the wind." After normalizing and resolving the type or attribute of the retrieved evidence references using the verb object characteristics (e.g., wind motions), the application of an outcome analysis to the analogy sentence may determine that the corpus references generally refer to the wind as "fast," and would deduce therefrom the meaning "Person <verb{run}>fast," which could be stored as an analogy/meaning/goal tuple for use in subsequent processing.

In another training example, each of the sentences, "Jack ran like a turtle" and "Jane ran like a hare" is parsed into its constituent noun/subject part (e.g., Jack), verb phrase part (ran), adjective/idiom phrase part (like), and noun/object part (turtle) which form a pattern. Before or after the constituent parts of the sentence pattern are assigned distinct terms to generate characteristic metadata for the parsed terms, the application of pattern extraction processing may be configured to recognize that there is a candidate pattern of a "(person) runs like (an animal)." Using this candidate pattern, the right analogic (animal running) is used to search the corpus and/or analogy tuple store to find similar or matching evidence references and associated meanings. Example evidence references returned from the corpus search might include "The cheetah runs at 50 miles per hour" and "The rabbit ran quickly through the brush" and "The turtle ran slow and steady." After normalizing and resolving the type or attribute of the retrieved evidence references using the verb object characteristics (e.g., animal running), the application of an outcome analysis to the analogy sentence may determine that the corpus references generally refer to "speed," and would deduce therefrom the meaning "Animal <verb{run}>speed," which could be stored as an analogy/meaning/goal tuple for use in subsequent processing. With this stored tuple, a newly detected analogy sentence (e.g., "Jeff ran like a gazelle") could be compared to the stored tuple to associate the new sentence with running speed, and then search for evidence of "gazelle running speed" as a speed attribute (e.g., fast or slow). Simple expansion or conjugation processing enables the QA system to deduce that Jane runs like a rabbit, Mark will run like a gazelle, etc.

In another training example that builds on the previously deduced analogy meanings, an example sentence, "Their assembly line runs like clockwork" is parsed into its constituent noun/subject part (e.g., assembly line), verb phrase part (runs), adjective/idiom phrase part (like), and noun/object part (clockwork) which form a candidate pattern. Using this candidate pattern to train against the previously stored analogy tuples for "run" comparisons to "animals" does not work because "assembly lines" and "clockwork" are not animals. Instead, the candidate pattern is used to search the corpus for evidence references to things being like clockwork. Example evidence references returned from the corpus search might include "Ruth arrives every Wednesday morning just like clockwork" and "The supervisor kept things running punctually, like clockwork" and "The trains ran like clockwork." After normalizing and resolving the type or attribute of the retrieved evidence references, the application of an outcome analysis to the analogy sentence may determine that the first two references to "like clockwork" have a consistency/timeliness element. In particular, "Every Wednesday" conveys a meaning of regular timeliness, and "Running punctually" is consistent timeliness. Regular/consistent timeliness is a hypothesis that can be applied to "the trains ran like clockwork." And with corpus evidence showing trains running on schedules, it is appropriate to consider "trains running like clockwork" as another example of timeliness. Thus, from the evidence, the outcome analysis may suggest that an analogy (<non-animal-thing> runs like clockwork) has a punctuality meaning.

Selected embodiments of the present disclosure are described with reference to detecting and evaluating analogies with a QA system, though other information handling systems or computing devices may be used. However implemented, it will be appreciated that the present disclosure may be used to identify analogies and their makeup by providing discrete information about these types of sentences, and to use analogic terms, characteristics, and metadata to serve as building blocks for cultural analogy detection and meaning by building and deducing a meaning for the analogy. The ability to derive the meaning of new analogies based on the characteristics of the terms and the usage within the statement can make a QA system much smarter being able to interact more human-like. In addition, the ability to deduce potential meanings and gravitate to one that fits more naturally based on similar corpus and characteristic fidelity with the statements can provide major insights into human statements. Meanings are backed by evidence based on the definition and characteristics of the analogy or idiomatic phrase or comparative noun phrase. The disclosed techniques can be used to provide a language detection service that is fed into a broader cognitive system, or can be a building block for dialog services for more human-like interaction.

By now, it will be appreciated that there is disclosed herein a system, method, apparatus, and computer program product for evaluating an analogical pattern at an information handling system having a processor and a memory. As disclosed, the system, method, apparatus, and computer program product apply natural language processing to an information source to identify a first analogical pattern having a subject term, a first verb phrase, a comparator term, a second verb phrase, and an object term. For example, the first analogical pattern may include a first analogic (which includes a subject noun term and a first verb), an adjective/idiom comparator term, and a second analogic (which includes a second verb and a noun object term). In selected embodiments, the natural language processing is applied to train the information source against a plurality of stored analogical patterns and associated interpretations. At the information handling system, deep analysis is applied to refine the first analogical pattern terms based on semantic analysis into corresponding entities, ontology, and characteristics, thereby forming metadata for the first analogical pattern. In selected embodiments, the deep analysis is applied to refine the first analogical pattern terms by using an external source to. In addition, the information handling system generates interpretations of different combinations of the first analogical pattern terms and the metadata, and then scores each interpretation for each of the different combinations. In selected embodiments, the interpretations are generated by identifying, for each combination, a relationship between the subject noun term, first verb, and noun object term to generate a corresponding interpretation. In addition or in the alternative, the interpretations are generated by extracting, for each combination, a definition for the first verb in relation to metadata characteristics of the noun object term and the adjective/idiom comparator term. Finally, the information handling system selects a first interpretation exceeding a predetermined threshold for interpretation of the analogical pattern, thereby evaluating the first analogical pattern.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, for evaluating an analogical pattern, the method comprising:
    applying, by the system, natural language processing to an information source to identify a first analogical pattern comprising a subject term, a first verb phrase, a comparator term, a second verb phrase, and an object term;
    applying, by the system, deep analysis to refine the first analogical pattern terms based on semantic analysis into corresponding entities, ontology, and characteristics, thereby forming metadata for the first analogical pattern;
    generating, by the system, interpretations of different combinations of the first analogical pattern terms and the metadata;
    scoring, by the system, each interpretation for each of the different combinations; and
    selecting a first interpretation exceeding a predetermined threshold for interpretation of the analogical pattern, thereby evaluating the first analogical pattern.

2. The method of claim 1, where applying natural language processing comprises training the information source against a plurality of stored analogical patterns and associated interpretations.

3. The method of claim 1, where applying deep analysis to refine the first analogical pattern terms comprises using an external source to refine the first analogical pattern terms.

4. The method of claim 3, where generating interpretations of different combinations comprises identifying, for each combination, a relationship between the subject noun term, first verb, and noun object term to generate a corresponding interpretation.

5. The method of claim 3, where generating interpretations of different combinations comprises extracting, for each combination, a definition for the first verb in relation to metadata characteristics of the noun object term and the adjective/idiom comparator term.

6. The method of claim 1, where the subject term comprises a subject noun term, the first verb phrase comprises a first verb, the comparator term comprises an adjective/idiom comparator term, the second verb phrase comprises a second verb, and the object term comprises a noun object term.

7. The method of claim 1, where the first analogical pattern comprises:
    a first analogic comprising the subject noun term and the first verb; and
    a second analogic comprising the second verb and the noun object term.

8. An information handling system comprising:
    one or more processors;
    a memory coupled to at least one of the processors;
    a set of instructions stored in the memory and executed by at least one of the processors to evaluate an analogical pattern, wherein the set of instructions are executable to perform actions of:
    applying, by the system, natural language processing to an information source to identify a first analogical pattern comprising a subject term, a first verb phrase, a comparator term, a second verb phrase, and an object term;
    applying, by the system, deep analysis to refine the first analogical pattern terms based on semantic analysis into corresponding entities, ontology, and characteristics, thereby forming metadata for the first analogical pattern;
    generating, by the system, interpretations of different combinations of the first analogical pattern terms and the metadata;
    scoring, by the system, each interpretation for each of the different combinations; and
    selecting a first interpretation exceeding a predetermined threshold for interpretation of the analogical pattern, thereby evaluating the first analogical pattern.

9. The information handling system of claim 8, wherein the set of instructions are executable to apply natural language processing by training the information source against a plurality of stored analogical patterns and associated interpretations.

10. The information handling system of claim 8, wherein the set of instructions are executable to apply deep analysis to refine the first analogical pattern terms by using an external source to refine the first analogical pattern terms.

11. The information handling system of claim 8, where the subject term comprises a subject noun term, the first verb phrase comprises a first verb, the comparator term comprises an adjective/idiom comparator term, the second verb phrase comprises a second verb, and the object term comprises a noun object term.

12. The information handling system of claim 11, wherein the set of instructions are executable to generate interpretations of different combinations by identifying, for each combination, a relationship between the subject noun term, first verb, and noun object term to generate a corresponding interpretation.

13. The information handling system of claim 11, wherein the set of instructions are executable to generate interpretations of different combinations by extracting, for each combination, a definition for the first verb in relation to metadata characteristics of the noun object term and the adjective/idiom comparator term.

14. The information handling system of claim 8, where the first analogical pattern comprises:
   a first analogic comprising the subject noun term and the first verb; and
   a second analogic comprising the second verb and the noun object term.

15. A computer program product stored in a computer readable storage medium, comprising computer instructions that, when executed by an information handling system, causes the system to evaluate an analogical pattern by:
   applying, by the system, natural language processing to an information source to identify a first analogical pattern comprising a subject term, a first verb phrase, a comparator term, a second verb phrase, and an object term;
   applying, by the system, deep analysis to refine the first analogical pattern terms based on semantic analysis into corresponding entities, ontology, and characteristics, thereby forming metadata for the first analogical pattern;
   generating, by the system, interpretations of different combinations of the first analogical pattern terms and the metadata;
   scoring, by the system, each interpretation for each of the different combinations; and
   selecting a first interpretation exceeding a predetermined threshold for interpretation of the analogical pattern, thereby evaluating the first analogical pattern.

16. The computer program product of claim 15, wherein applying natural language processing comprises training the information source against a plurality of stored analogical patterns and associated interpretations.

17. The computer program product of claim 15, wherein applying deep analysis to refine the first analogical pattern terms comprises using an external source to refine the first analogical pattern terms.

18. The computer program product of claim 15, where the subject term comprises a subject noun term, the first verb phrase comprises a first verb, the comparator term comprises an adjective/idiom comparator term, the second verb phrase comprises a second verb, and the object term comprises a noun object term.

19. The computer program product of claim 18, where generating interpretations of different combinations comprises identifying, for each combination, a relationship between the subject noun term, first verb, and noun object term to generate a corresponding interpretation.

20. The computer program product of claim 18, where generating interpretations of different combinations comprises extracting, for each combination, a definition for the first verb in relation to metadata characteristics of the noun object term and the adjective/idiom comparator term.

21. The computer program product of claim 15, where the first analogical pattern comprises:
   a first analogic comprising the subject noun term and the first verb; and
   a second analogic comprising the second verb and the noun object term.

* * * * *